June 23, 1942.                   W. E. McCOLGAN                    2,287,261
                                    BRAKE SHOE
                                Filed Aug. 30, 1941              2 Sheets-Sheet 1
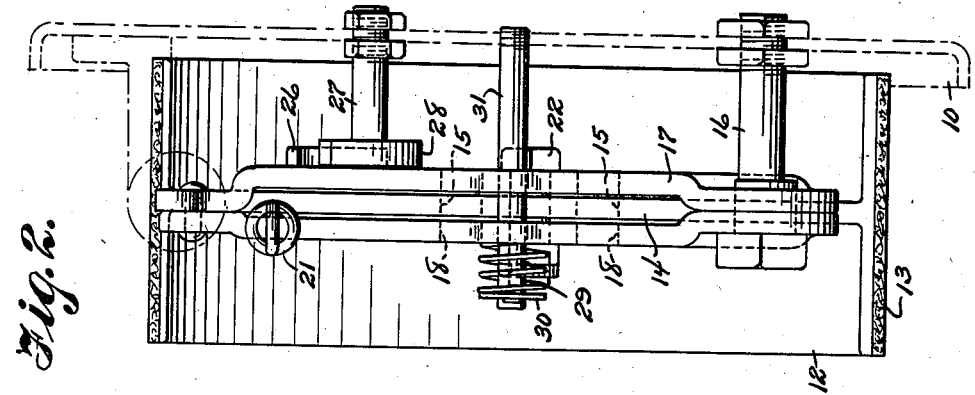
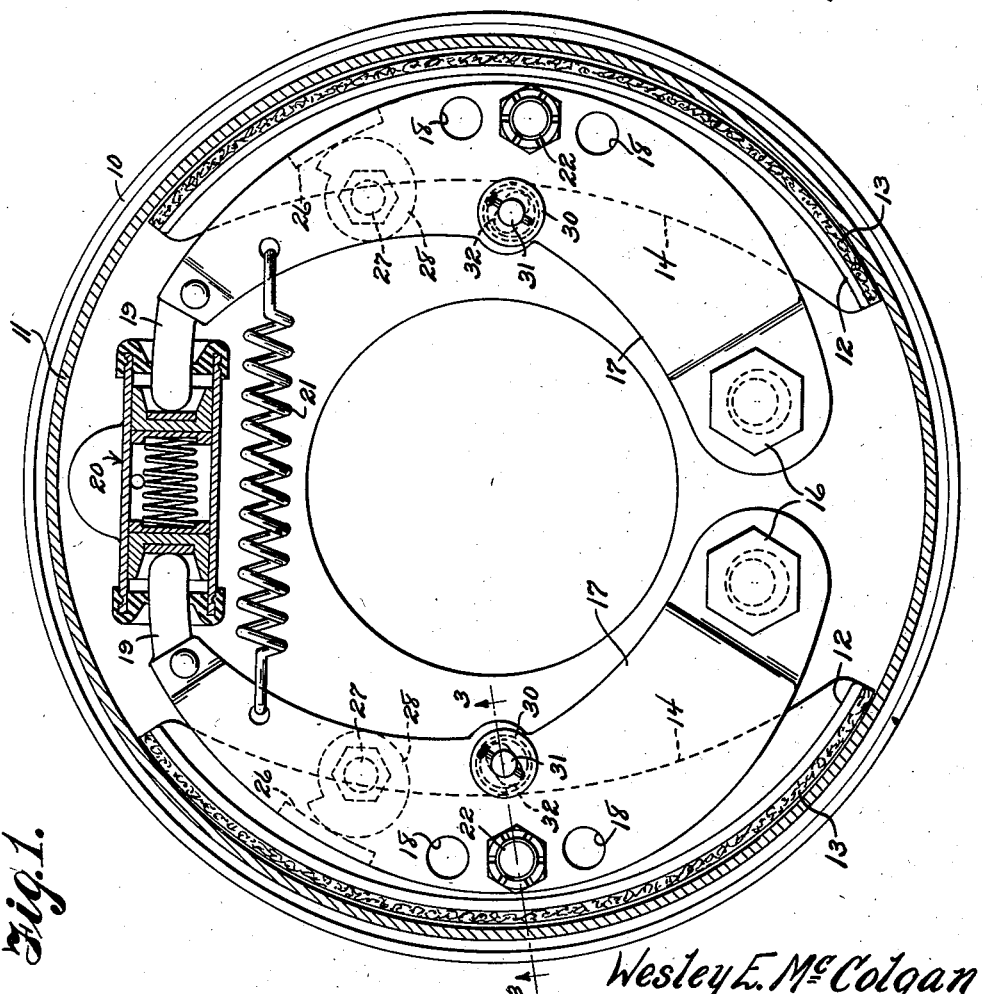
Wesley E. McColgan
INVENTOR
BY Victor J. Evans & Co.
ATTORNEYS June 23, 1942.　　　W. E. McCOLGAN　　　2,287,261
BRAKE SHOE
Filed Aug. 30, 1941　　　2 Sheets-Sheet 2

Wesley E. McColgan INVENTOR
BY Victor J. Evans & Co.
ATTORNEYS

Patented June 23, 1942

2,287,261

UNITED STATES PATENT OFFICE 2,287,261

BRAKE SHOE

Wesley E. McColgan, Trinity Center, Calif.

Application August 30, 1941, Serial No. 409,050

4 Claims. (Cl. 188—78)

This invention relates to brake shoes, and more particularly to those of the type generally used in automotive vehicles.

I realize that various types of brake operating devices have long occupied the attention of inventors, especially when operated by hydraulic pressure. Certain developments have been made, giving more or less satisfactory results, but, so far as I am aware, no one has produced a device having the specific advantageous combination and arrangement of parts of that embodied in my invention.

The object of this invention is to increase the efficiency of brake operating mechanisms.

Another object of the invention is to increase the power with which brake shoes may be forced against the drum.

Still another object is to provide a minimum retracting motion in hydraulic brake shoes, thereby decreasing the stroke of the master piston necessary to apply the brakes.

A further object is to obtain a finer adjustment of leverage and stroke to increase the efficiency of brake mechanisms.

A further object is a rigid and durable device for accomplishing the above results.

These and other objects may be accomplished by my invention which embodies among its features a conventional brake mechanism consisting of a drum and an internal shoe having a webbing, a two-plated lever pivoted at one end and straddling the webbing, a plurality of holes in the lever and webbing and a bolt to connect any set of holes selectively to provide adjustment of the mechanical advantage of the lever, a cam-like adjustment means between the shoe and lever to limit the retracting movement of the shoe, spring means to hold the lever and webbing in alignment, and hydraulic cylinders for operating the brake.

Other objects and features may become evident from the following disclosure when taken in connection with the accompanying drawings, in which:

Figure 1 is a cross-section view taken vertically through my device.

Figure 2 is an end elevation of my brake shoe and lever.

Figure 4:
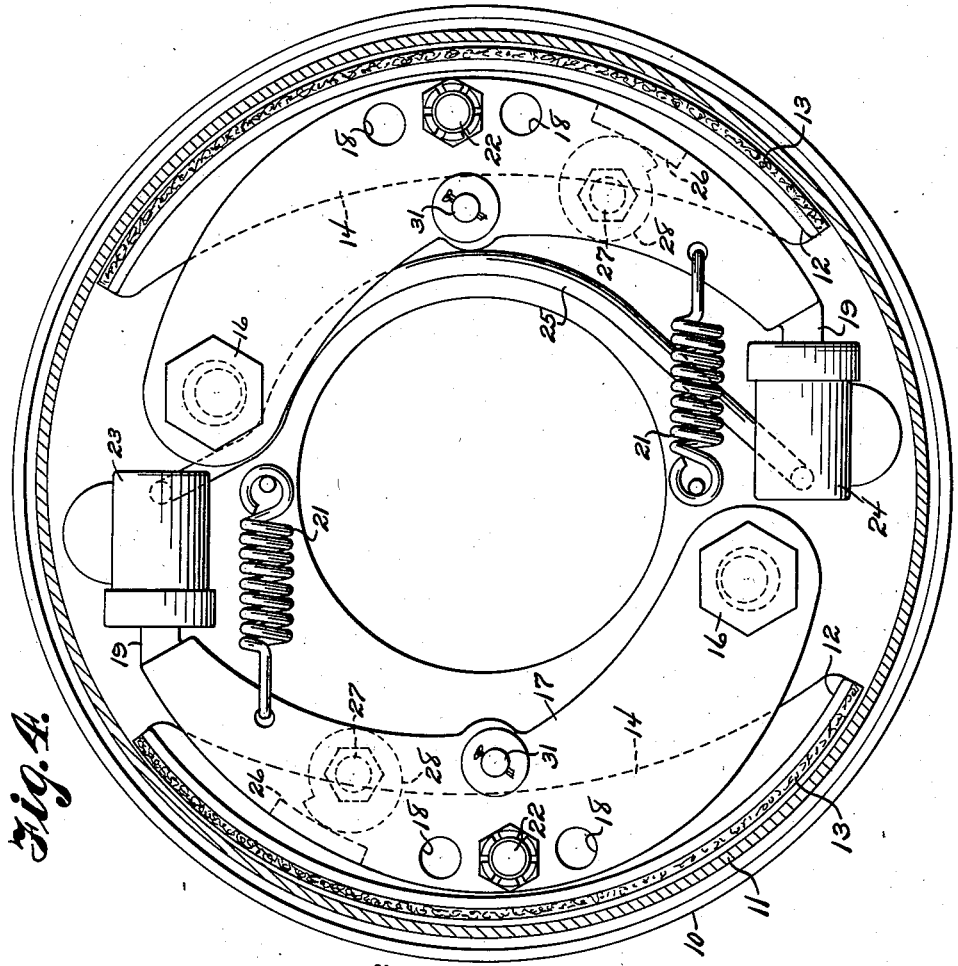
Figure 4 is a vertical cross-section of a modification.
Figure 3:
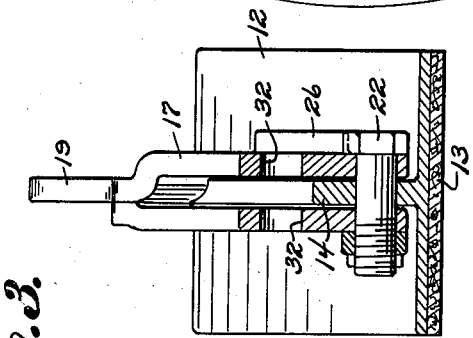
Figure 3 is a cross-section taken on line 3—3 of Figure 1.

Referring to the drawings in detail, a base plate 10 holds the brake shoes and operating mechanism, which are surrounded by a brake drum 11. Each shoe consists of an arcuate-shaped member 12 carrying a conventional lining 13 and, in its center, a webbing 14. There are a plurality of holes 15 in the webbing for adjustability, as will be hereinafter explained.

Affixed to the base plate 10 near the heels of the shoes are bolts 16, which act as pivots for levers 17, said levers are each formed of two plates as shown, welded together at their ends and spaced so as to straddle the webbing 14. There are also holes 18 in the levers, corresponding to holes 15 in the webbing. The pressure is applied to the levers by plungers 19 in the upper ends thereof, from a conventional cylinder and piston mechanism 20. A spring 21 tends to keep the levers in brake-retracting position.

For adjustability of the force by which the brakes may be applied I provide a bolt 22 which may selectively be placed in any set of holes 18 on the lever and 15 on the webbing. It will be noted that the closer the bolt is positioned to the fulcrum 16, the greater will be the mechanical advantage through which the pressure as put in by plunger 19 operates. By this means I am able to regulate the pressure with which the brakes are applied.

It is further to be noted that the lever fulcrum 16 is positioned below and displaced from the point of pivot between the lever and brake shoe. This causes a substantial toggle action, on the side toward which the wheel is turning, which increases the pressure by which the brake is applied. On the other side, however, this toggle action works in a negative direction, and so I contemplate a modification of my device as shown in Figure 4.

In this form the structure and operation of the shoes and levers is identical with that shown in Figure 1, but they are positioned in opposite directions as shown. The pressure end of each lever has a separate cylinder mechanism 23 and 24, connected by duct 25. By this modification I get a toggle action and increased braking pressure on both shoes when the wheel is turning in the forward direction.

To limit the motion of the levers in the retracting direction, there is a lug 26 stamped out from the edges of each lever, and, mounted on base plate 10 by a post 27, there is a cam-shaped stop 28. The stop may be adjusted by turning post 27 and this will regulate the return motion of the lever 17. By this means adjustment may be made to provide a minimum stroke of the master piston of the hydraulic brakes and accordingly the movement of the foot pedal to apply the brakes and at the same time prevent "dragging."

In order to keep the levers, and also the shoes, in alignment each is provided with a spring 29 operating on the opposite side from that of the stops 28 to hold the lever thereagainst. The springs are held by washers 30 keyed on bolts 31 which are threaded into base plates 10. There are elongated apertures 32 formed in the levers for the passage of these bolts, still allowing sufficient movement of the levers for operation.

By the means set out above I provide a brake which has increased effectiveness and may be adjusted for both pressure and stroke. Although a preferred embodiment is disclosed herein, I do not wish to be limited thereto but only by the scope of the appended claims.

What is claimed is:

1. In a brake mechanism, a base plate, a drum, an internal shoe having a webbing provided with a plurality of holes, a two-sided lever having a plurality of holes pivoted near the heel of the shoe to the base plate, and straddling the webbing, a stop member on the lever, compression means for applying force to the end of the lever near the toe of the shoe, a bolt adapted to be inserted in any set of holes, selectively, in the webbing and lever, and a cam-shaped member on the base plate abutting the lever and adjustably coacting with the stop to limit the movement of the lever when the shoe is retracted.

2. The structure set out in claim 1 with the addition of a spring means mounted on the base plate and acting to hold the lever against the cam member.

3. In a brake mechanism, a base plate, a drum mounted adjacent the base plate, a pair of shoes disposed to act against the said drum, a lever pivotally connected to each shoe having one end pivotally connected to the base plate, means connected to the opposite end of each lever for actuating the same and the shoe connected therewith, a projection on each lever, a pair of posts rotatably mounted on the base plate, a cam member fixed on each of the said posts engageable with the projection of each lever for limiting the retracting movement of the lever, a bolt secured to the base plate and extending through an aperture in each of the said levers, and a compression spring mounted on the end portion of each of the said bolts acting against each lever for maintaining the projection of the lever in co-acting relation with the cam.

4. In brake mechanism, a base plate, a rotary drum adjacent the base plate, a pair of shoes disposed to act against the said drum, a pair of pivotally operable levers supported on the base plate and pivotally connected with the respective shoes, a pair of cam carrying posts rotatably mounted on the base plate, a projection extending laterally from one side of each lever engageable with the said cams for limiting the retracting movement of the levers, and means supported on the base plate and bearing against one side of each lever so as to maintain the projection thereon in co-acting relation with the cam.

WESLEY E. McCOLGAN.